United States Patent
Dorsey et al.

(10) Patent No.: US 9,309,033 B2
(45) Date of Patent: Apr. 12, 2016

(54) MOUNTING FEATURE FOR A CABLE TIE

(71) Applicant: Avery Dennison Corporation, Mentor, OH (US)

(72) Inventors: Noah Dorsey, Watertown, MA (US); Daniel Gilbertson, Millbury, MA (US)

(73) Assignee: Avery Dennison Corporation, Glendale, CA (US)

( * ) Notice: Subject to any disclaimer, the term of this patent is extended or adjusted under 35 U.S.C. 154(b) by 158 days.

(21) Appl. No.: 14/059,768

(22) Filed: Oct. 22, 2013

(65) Prior Publication Data

US 2014/0182086 A1 Jul. 3, 2014

Related U.S. Application Data

(60) Provisional application No. 61/716,789, filed on Oct. 22, 2012.

(51) Int. Cl.
*B65D 63/00* (2006.01)
*H02G 3/32* (2006.01)

(52) U.S. Cl.
CPC .................. *B65D 63/00* (2013.01); *H02G 3/32* (2013.01); *Y10T 24/14* (2015.01); *Y10T 29/49826* (2015.01)

(58) Field of Classification Search
CPC .... B65D 63/00; B65D 63/10; B65D 63/1018; B65D 63/1027; B65D 63/1063; B65D 63/1072; B65D 63/1081; B65D 63/109; B65D 63/18; H02G 3/32; Y10T 24/14
See application file for complete search history.

(56) References Cited

U.S. PATENT DOCUMENTS

| | | | | |
|---|---|---|---|---|
| 4,728,236 A | * | 3/1988 | Kraus | 411/437 |
| 4,859,129 A | * | 8/1989 | Kraus | F16B 37/0842 24/662 |
| 4,999,019 A | * | 3/1991 | Kraus | F16B 37/0842 24/297 |
| 5,056,837 A | * | 10/1991 | Fuehrer | 292/307 R |
| 5,460,342 A | * | 10/1995 | Dore et al. | 248/74.2 |
| 5,598,994 A | * | 2/1997 | Olewinski et al. | 248/73 |
| 5,803,413 A | * | 9/1998 | Benoit et al. | 248/73 |
| 5,926,921 A | * | 7/1999 | Benoit | 24/16 PB |

FOREIGN PATENT DOCUMENTS

| | | |
|---|---|---|
| DE | 29721937 | 4/1999 |
| EP | 0751597 | 1/1997 |
| WO | 87/07697 | 12/1987 |

OTHER PUBLICATIONS

International Search Report and Written Opinion dated Jan. 22, 2014 for International Application No. PCT/US2013/066068.
International Preliminary Report on Patentability and Written Opinion dated Apr. 25, 2015 for International Application No. PCT/US2013/066068.

* cited by examiner

*Primary Examiner* — Rowland Do
(74) *Attorney, Agent, or Firm* — Avery Dennison Retail Information Services, LLC

(57) ABSTRACT

A mounting feature for a cable tie is provided in which the mounting feature has at least one divided retention component. The center-most edges of the at least one divided retention component contact a mating article on the edge of the mating article, such as the threaded portion, decreasing the amount of fastening force required to affix the mounting feature of the cable tie to a mating article while not compromising the optimal amount of required extraction force. A method for affixing the mounting feature to a mating article is also provided.

19 Claims, 10 Drawing Sheets

MOUNTING FEATURE FOR A CABLE TIE

CROSS-REFERENCE TO RELATED APPLICATION(S)

The present application claims priority from U.S. Provisional Application No. 61/716,789 filed Oct. 22, 2012, which is incorporated by herein by reference in its entirety.

FIELD OF THE INVENTION

The present invention relates to cable ties. More specifically, the present invention relates to weld stud cable ties for use in automotive and other industrial and related applications.

BACKGROUND OF THE INVENTION

Cable ties are well known in the art and are commonly used to bundle together a plurality of objects such as a group of parallel wires or cables. One type of cable tie which is well known in the art includes a serrated strap which is fitted to an aperture head. In use, the cable tie can be formed into a closed loop by inserting the serrated strap through the aperture head. With the serrated strap inserted through the aperture head, an internal pawl, or locking mechanism disposed within the aperture head lockably engages the serrations of the strap to prevent the strap from being backed out of or removed from the aperture head. In this manner, the engagement of an internal pawl in the head onto the serrated strap secures the cable tie in its closed loop or secured configuration.

In certain applications, it is desirable to retain a group of wires or cables bundled with a cable tie securely to another article or structure. In particular for example, in the automotive industry it is often desirable to retain a group of electrical wires bundled with a cable tie securely against an automotive panel or structural element. Securing the bundle may include the use of an automotive bolt so as to preclude the bundle from moving (i.e. rattling) within that automobile body during operation of the vehicle and thereby interfering with operation of the engine. Accordingly, cable ties are commonly provided with an insert fastener which can be coupled to an automotive panel. Insert fasteners are commonly constructed in a variety of different configurations and may provide an incremental cost element due to the additional element and labor related to the installation and assembly.

A need exists in the marketplace to be able to attach multiple cable ties to a single bolt. Currently, when there is more than one cable tie attached to the helical strands of a bolt, the additional ties may have fewer contact points available on the helical strands of the bolt for attachment. Therefore, a need exists for a cable tie that is able to attach to bolt or other mating article such that multiple cable ties may be attached to the same bolt.

Currently, in the marketplace cable ties can only attach to a bolt at specific contact points on the bolt which limits the structural integrity of the cable tie assembly. The weld stud fasteners presently in use in the marketplace generally require a higher extraction force which in turn, requires a higher fastening force in order to attach the mounting feature of the weld stud fastener to the mating or mounting bolt. Generally, optimizing either the fastening force or the extraction force of the cable tie will cause the non-optimized force to change. For instance, currently in the marketplace, if the fastening force is lowered the extraction force will also be lowered which is not desirable. A need exists for a weld stud cable tie that can serve as a fastener for a wire bundle and which can be attached to a portion of a bolt, e.g. the threaded portion. The installation of the cable tie fastener can ideally be done at an optimal extraction force as well as an optimal fastening force that conforms to desirable performance specifications that require a low fastening force (<10 lbs) and a high extraction force (>40 lbs).

BRIEF SUMMARY OF THE INVENTION

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

It is an object of the present invention to provide a mounting feature for a cable tie in which the components of the mounting feature use a higher extraction force while requiring a lower fastening force when compared with conventional cable tie fasteners.

It is another object of the present invention to provide a mounting feature that may be used with a component of a weld stud cable tie and/or a fastener.

It is still yet another object of the present invention to provide a method for affixing a mounting feature of the present invention to a mating or mounting article such a bolt.

Other features and advantages of the present invention will become apparent to those skilled in the art from the following detailed description. It is to be understood, however, that the detailed description of the various embodiments and specific examples, while indicating preferred and other embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

These, as well as other objects and advantages of this invention, will be more completely understood and appreciated by referring to the following more detailed description of the presently preferred exemplary embodiments of the invention in conjunction with the accompanying drawings, of which.

DETAILED DESCRIPTION OF THE INVENTION

The present invention is now illustrated in greater detail by way of the following detailed description which represents the best presently known mode of carrying out the invention. However, it should be understood that this description is not to be used to limit the present invention, but rather is provided for the purpose of illustrating the general features of the invention.

Figure 1:
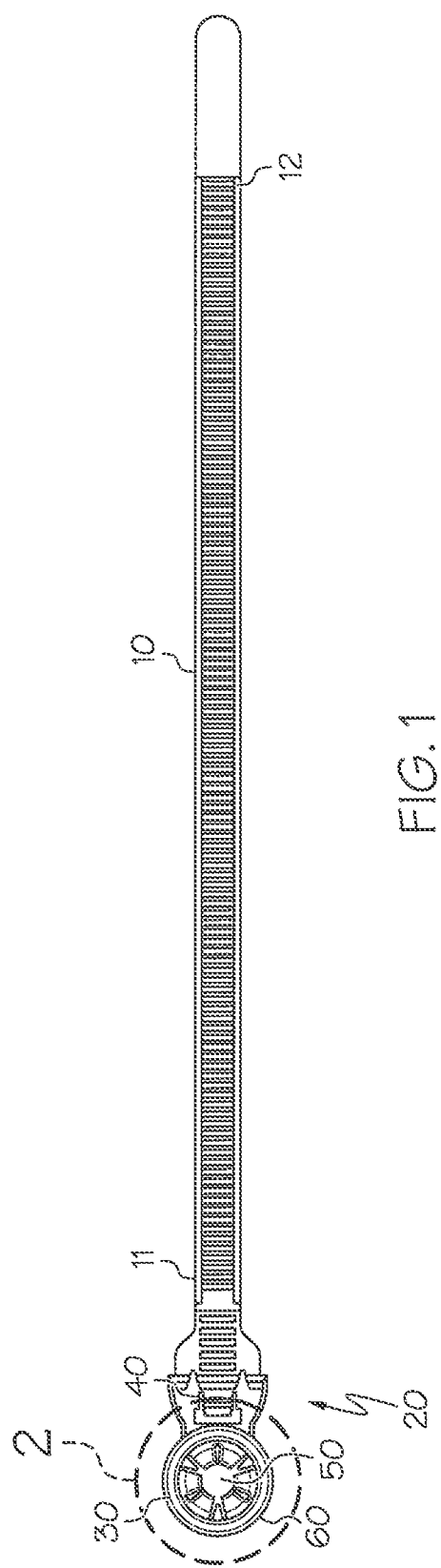
FIG. 1 depicts a top perspective view of a cable tie of the present invention.
Figure 9:
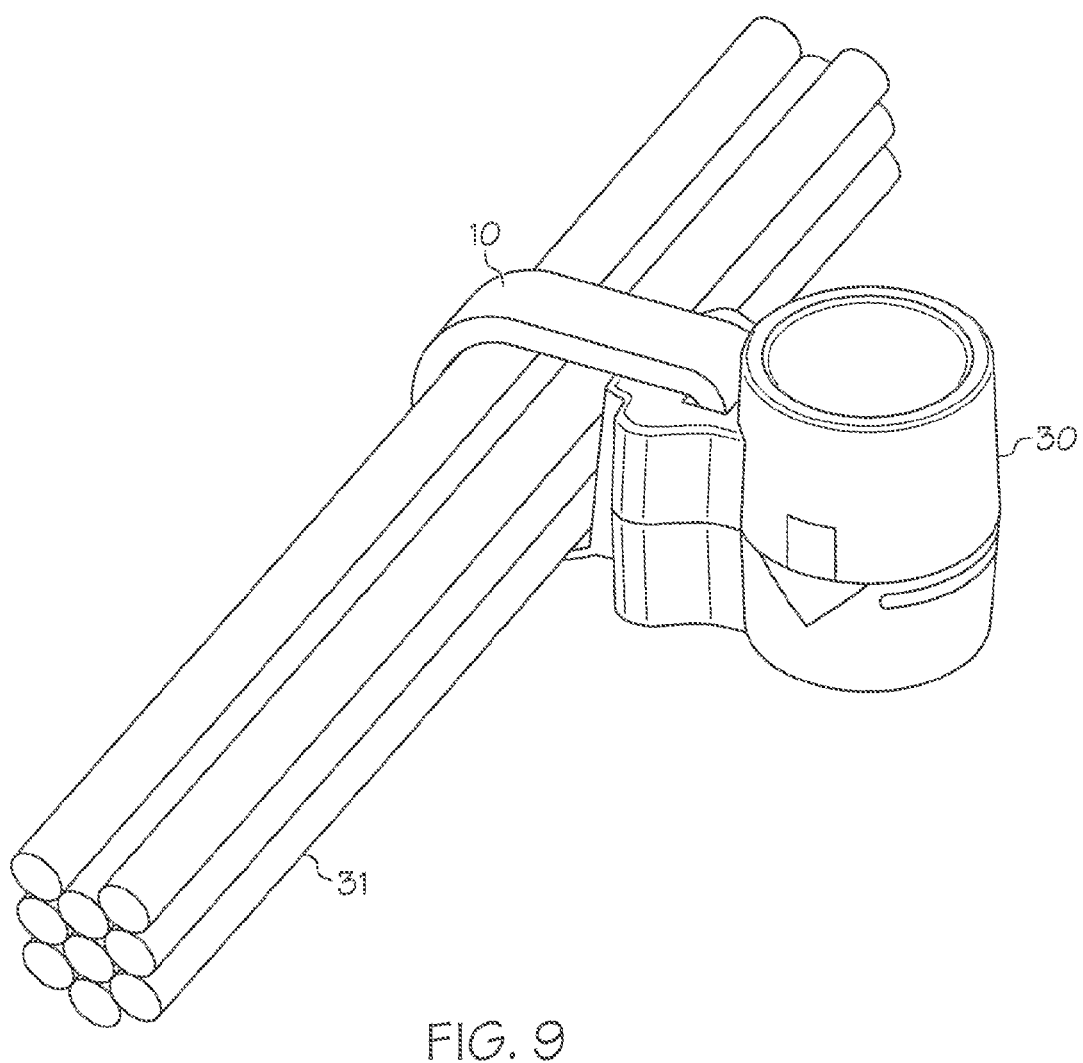
FIG. 9 illustrates a wire bundle being held together by the cable tie of the present invention.

Referring to the figures, FIG. 1 illustrates a weld stud cable tie generally depicted by reference numeral 20. While the present invention discusses the utilization of a weld stud cable tie, it is notable that the cable tie presently set forth may also be utilized as a fastener to affix, join or couple two or more objects to one another. For instance, as illustrated in FIG. 9, the cable tie as illustrated in FIG. 1 may be utilized to affix a bundle of electrical wires 31 or cables to a mating bolt via the mounting feature 30. That is, the bundle of wires is held in the location adjacent the bolt in the engine compartment. The wire bundle is held together by the elongated portion 10 which has a first end 11 and a second end 12. As illustrated in FIG. 1, the elongated portion 10, in one embodiment, is a flexible "ladder-like" member, having a series of regularly spaced steps or rungs. The elongated portion 10 is generally uniform in shape and has a generally rectangular, lateral cross-section. The present invention also contemplates that the elongated portion 10 may be constructed in alternative sizes and shapes without departing from the present invention. For instance, in one embodiment, the elongated member may have serrated elements, regular openings, pegs, notches or holes and the elongated member may taper at second end 12.

FIG. 1 further illustrates a mounting feature 60 which in one embodiment, has an aperture or opening 50 in the head feature. The aperture or opening 50 permits the threaded portion of the mating or mounting bolt to be inserted into the mounting feature 60. When the elongated portion 10 is formed into a loop or other shape in order to bundle together a plurality of objects, such as a plurality of wires, the second end 12 may be inserted through an opening in the head fastening portion 40 in order to affix the looped elongated portion 10 to the bundle of objects, thereby encircling and grouping the bundle of loose items. The head fastening feature 40 has an internal locking mechanism to secure the elongated member 10 in a loop formation.

The cable tie of the present invention may be produced from a plastic material such as nylon using conventional molding techniques, such as injection molding. The present invention also contemplates that the weld stud cable tie may be produced from other flexible materials. The selected materials should be able to withstand the potentially harsh environment in which the materials will be used, such as with the exposure to heat, lubricants and the like such as might be encountered in an engine compartment in an automobile.

Continuing with the discussion of FIG. 1, a mounting feature 30 has at least one opening 50 for a mating article, such as a bolt, to be inserted through the opening. The mounting feature 30, "mates" or conforms to the mating article, such as a bolt stem or threaded portion of the bolt used for automotive purposes. For instance, in one embodiment, the mating bolt may be a M5 and/or M6 bolt. The "M" refers to metric and the numerical designation 5 or 6 refers to the diameter of the bolt, such as 5 mm or 6 mm. The M5 bolt has a thread spacing of about 0.8 mm and the M6 has a thread spacing, know as pitch in the art, of about 1 mm.

Figure 7:
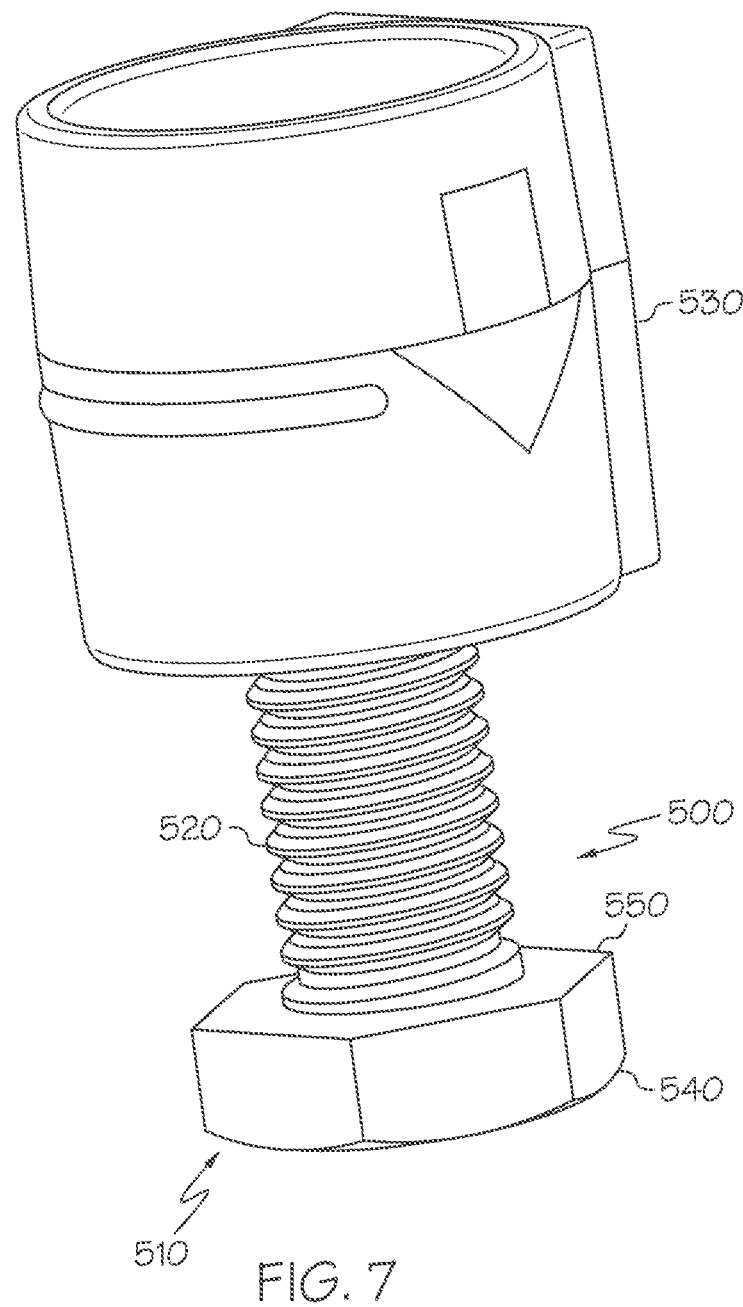
FIG. 7 illustrates a mounting feature being attached to the threaded portion of the mating bolt.

The mating bolt 500 has a head 510, an elongated, helical or threaded section 520, and may have a top 550 and bottom face 540 as illustrated in FIG. 7. While it is illustrated in the figures of the present invention that the opening 50 (see FIG. 1) for the mating article is circular, it is contemplated that the opening 50 may be other geometrical shapes, as well, and may conform to the particular mounting assembly, such as square, rectangle and the like.

In an exemplary embodiment of the present invention as illustrated in FIG. 7, a mounting feature 530 is attached to a mating article such as the threaded portion of the bolt 500 at the helical strands 520 of the bolt. The mounting feature 530 is pushed onto the bolt 500 via the helical strands 520 of the bolt and, in one embodiment, gradually moves further down the helical strands 520 until the mounting feature 530 contacts the face 550 of the head 510 of the bolt. The present invention also contemplates that a bolt may not, in one embodiment, have a head component. For instance, when a bolt is spot-welded to the chassis of a vehicle, a bolt may lack a head portion. In this situation, the mounting feature 530 may not contact the top face 550 of the bolt but instead may be pushed onto the bolt 500 to a certain contact point on the helical strands of the bolt. The present invention contemplates that more than one mounting feature may be attached to the helical strands of a bolt when there is already another fastener on the bolt creating a reduced contact area on the helical strands for attachment of the subsequent mounting feature.

Figure 2:
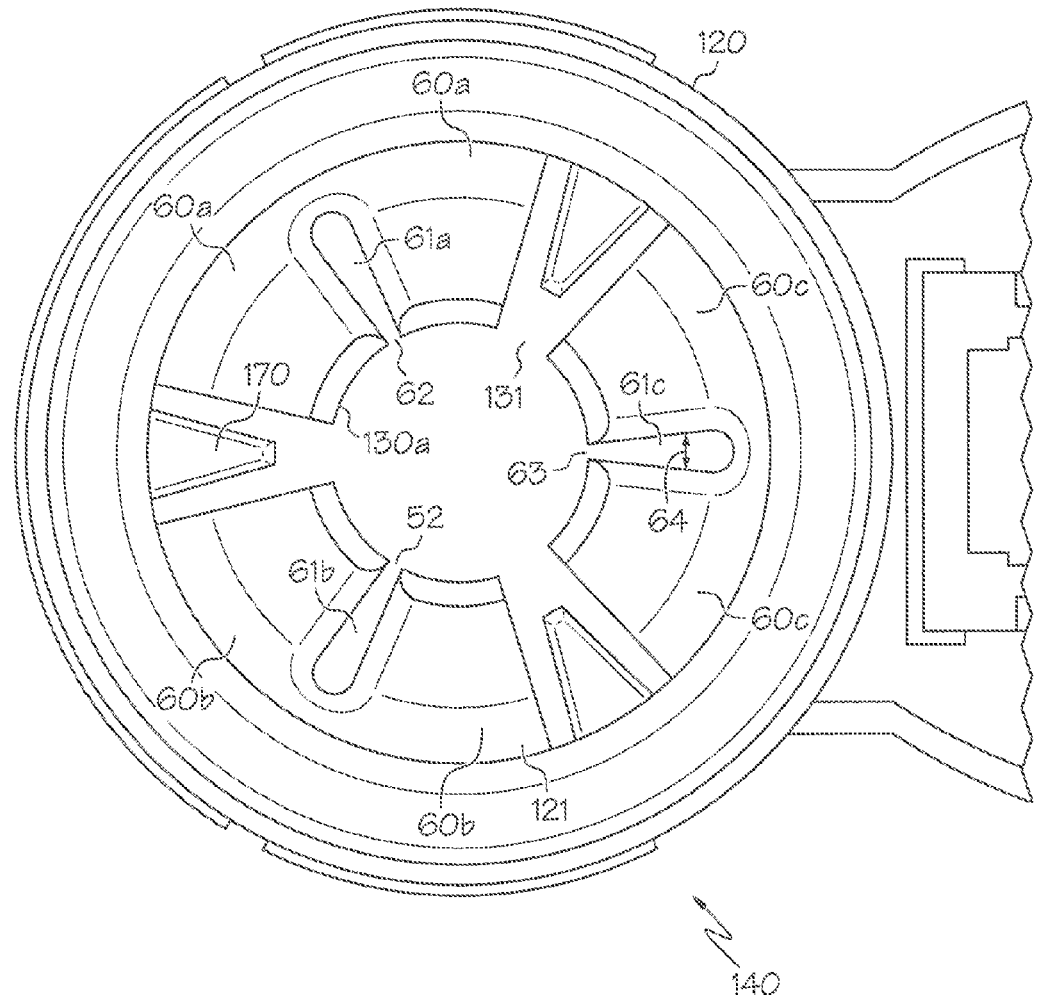
FIG. 2 is an enlarged view of the head of the mounting feature of the present invention not attached to a mating article.

FIG. 2 illustrates a mounting feature 140 of the present invention that has an outer barrel 120 and an inner barrel 121. The outer and inner barrel configuration cooperates to provide the generally circular configuration of the mounting feature. However, the present invention contemplates the mounting feature may not be in generally circular configuration but may also be somewhat of a triangular shape or other geometrical shape.

The mounting feature has at least three retention components 60a, 60b, 60c which are used to secure the fastener to the stem of the bold. It should be understood that the mounting feature may have more or less than three retention components. In an exemplary embodiment of the present invention, the retention components are smaller in height than those retention components currently available in the marketplace and, thus, the retention components are situated at a lower position on the inner barrel of the mounting feature closer to the bottom 172 of the inner barrel as illustrated in FIG. 3a. The lower positioning of the retention components on the inner barrel of the mounting feature of the present invention allows for a mounting feature to be attached to the helical strands on the stem of a bolt when there is a reduced amount of contact area available for attachment of the mounting feature either due to another fastener or limited surface area due to the position of location of the bold.

Figure 5:
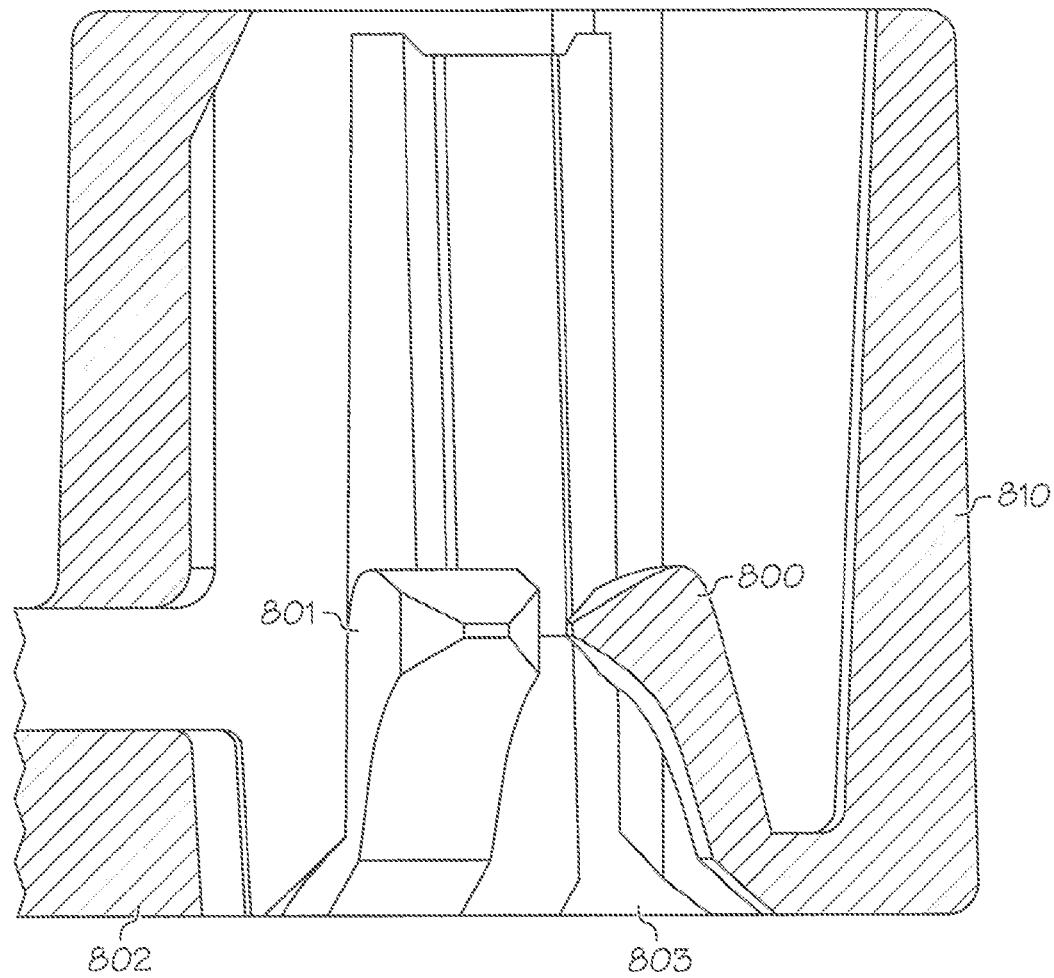
FIG. 5 illustrates a flap on the inner barrel of a mounting feature of the prior art.
Figure 5A:
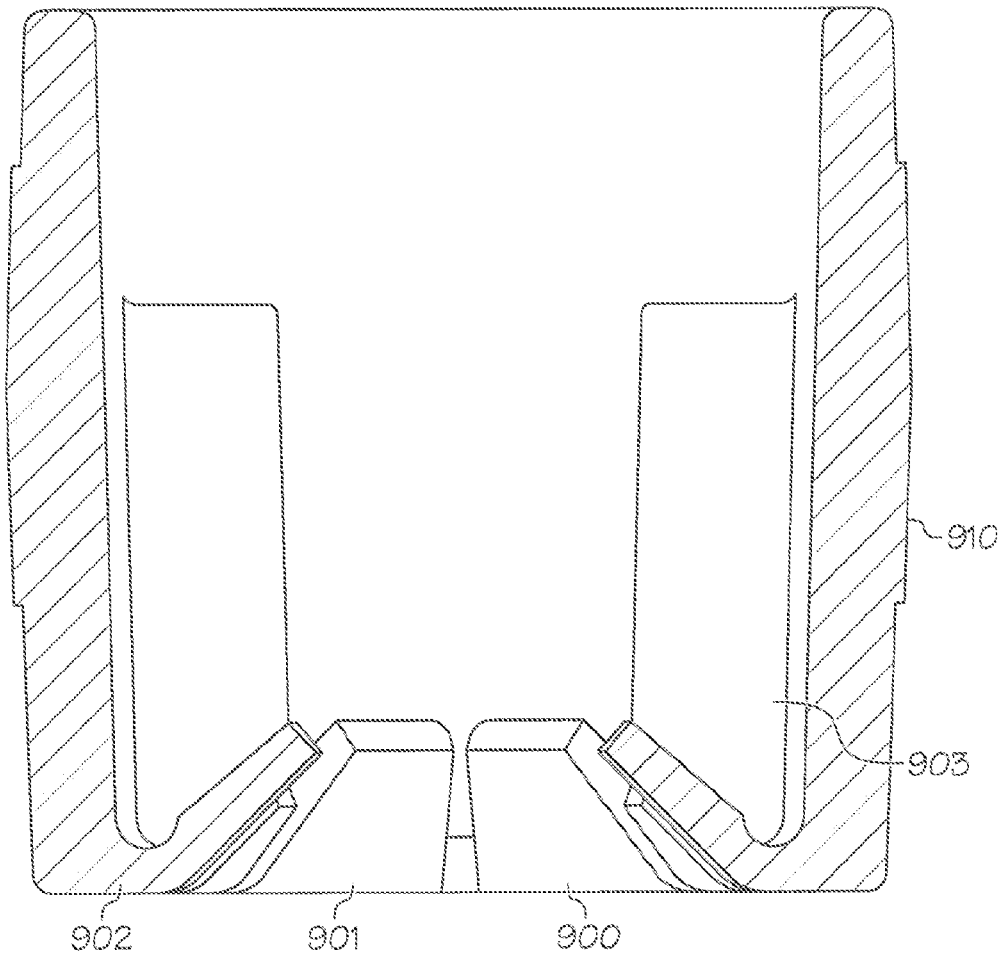
FIG. 5a illustrates a flap on the inner barrel of the mounting feature of the present invention.

FIG. 5 illustrates a mounting feature currently available in the marketplace. In FIG. 5, the retention components 800 and 801 have a height of 0.218 and 0.208 inches as measured from the bottom 802 of the inner barrel 803 of the mounting feature 810. FIG. 5a, which shows the present invention, illustrates that the retention components 901 and 900 have a smaller height than the retention components in FIG. 5. As illustrated, in one embodiment, the retention components 901 and 900 have a height of approximately 0.0705 inches as measured from the bottom 902 of inner barrel 903 of the mounting feature 910.

Each of the retention components 60a, 60b, and 60c has a divided center portion 61a, 61b, 61c. The center portion 61a, 61b, 61c of the retention components 60a, 60b, 60c may be formed by means known in the art such as die-cutting, stamping, laser cutting, or via molding The division of each of the center portions 61a, 61, 61c of the three retention components 60a, 60b, 60c in FIG. 2 gives the illusion that there are six retention components or "flaps" due to the division. However, this is not the case as the division of the center portion does not divide the retention component completely to the inner face of the outer barrel 120 of the mounting feature. The division of each of the center portions of each of the retention components 60a, 60b, 60c results in each of the retention components 60a, 60b, 60c having a first section 150 and a second section 160 in which the first section 150 and the second section 160 are divided by a gap 62.

In one embodiment, the gap 62 may be a small perforation sized opening in the retention component 60a, 60b, 60c, but larger sized gaps are also contemplated by the present invention. For instance, in one embodiment contemplated by the present invention, the gap 62 may be 0.0070 inches in width at the narrowest part of the gap at its opening 63 and may increase to a width of 0.2001 inches at a wider portion 64 of gap. The present invention also contemplates that the gap is not limited to a particular shape or size. The first section 150 of each retention component has a center most edge 130a and the second section 160 of each retention component has a center-most edge 130b.

The division of the center portions 61a, 61b, 61c as seen in FIG. 2 of each retention component 60a, 60b, 60c allows for the first 150 section and second 160 section of each retention component to flex independently from one another. As the sections are capable of independently flexing from one another, the first and second sections, 150, 160, of each retention component are able to better "nest" within the individual helical threads of a the stem of the mating bolt as shown in FIG. 4.

As illustrated in FIG. 2, ribs 170 are formed in the inner barrel 121 of the mounting feature 140 in order to surround the mating article and add additional support to the fastener when it is in position. The ribs 170 are distinguishable from the retention components 60 in that the ribs 170 have a greater length than that of the retention components 60a, 60b, 60c. In one embodiment, as illustrated in FIG. 2, the number of ribs 170 corresponds with the number of retention components 60a, 60b, 60c and the ribs 170 and retention components 60a, 60b, 60c are in an alternating arrangement. In other embodiments, there may be a fewer number or a greater number of ribs 170 than retention components 60a, 60b, 60c and the ribs and the retention components may not be constructed in an alternating pattern.

Figure 3:
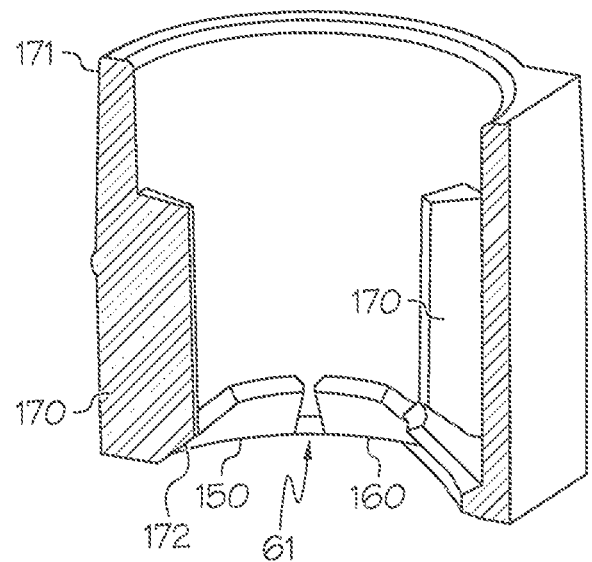
FIG. 3 is a cut away sectional view of the mounting feature of FIG. 2.

Attention is now directed to FIG. 3, which illustrates a sectional view of the mounting feature of the present invention. FIG. 3 shows that the ribs 170 are significantly taller than the retention components 60a, 60b, 60c, and extend vertically upward from the base of the mounting feature and perpendicularly from the walls of the mounting feature. The retention components 60 extend generally inwardly of the opening 50 and are inclined upwardly at an angle ranging from 15° to about 60°, the angle that the retention component forms with the perpendicular surface 45. The channel elements 170 extend inwardly at approximately 90° from the inner barrel and are arranged at approximately equal intervals around the opening.

Figure 4:
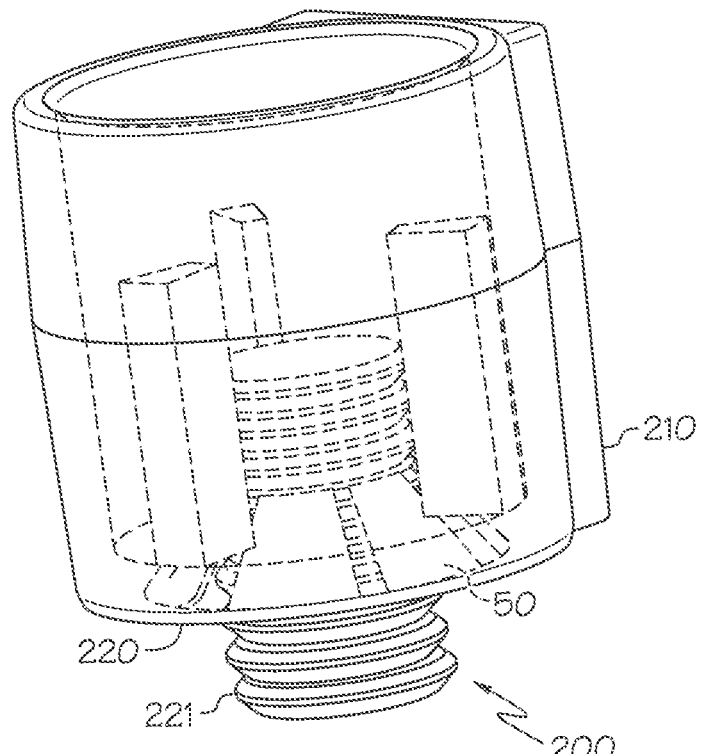
FIG. 4 is an enlarged, side view of the mounting feature of FIG. 2 of the present invention in which the threaded portion of the mating bolt is inserted into a mounting feature.

FIG. 4 illustrates the helical strands 221 of the mating bolt 200 after having been inserted within the opening 50 of the mounting feature 210 of the present invention. The mating bolt 200 contacts the center-most edges of each of the first and second sections of each of the retention components 220 of the mounting feature. The rib elements 170 provide support and guide the bolt 200 into the opening and limit the side-to-side motion of the cable tie preventing disassembly of the cable tie from the mating article.

As illustrated further in FIG. 7, a mounting feature 530 is shown attached to a bolt 500 via the helical strands or threads 520 of the stem of the bolt such that the helical strands 520 of the stem are inserted through the opening 50 in the mounting feature 530. The mounting feature 530 is pushed onto the bolt 500 stem via the helical strands or threads 520 and gradually moves further down the helical strands 520 until the mounting feature 530 comes into contact with the inner face 550 of the head 510 of the bolt. The present invention also contemplates other embodiments in which the mounting feature 530 does not move down the helical strands of the bolt all the way to the inner face 550 of the head 510 of the bolt 510. The retention components of the mounting feature are preferably stiff in one embodiment of the present invention and while they may move upward and outward as the bolt is being inserted, the movement is slight in order that there may be a rigid and tight connection to the stem of the bolt. The present invention contemplates that more than one mounting feature may be attached to the helical strands of a single bolt.

The utilization of the unique design of the retention features 60, allows for the mounting feature 60 of the present invention to have a high extraction (retention) force without sacrificing the insertion (fastening) force. Thus, the retention components 60a, 60b, 60c of the present invention allow for a mounting feature that has a high retention force as well as a low insertion force which is desirable for one skilled in the art. Possible extraction and insertion forces capable for an M5 and M6 stud using the mounting feature of the present invention are illustrated in Tables 1 and 2 below.

TABLE 1

| M5 Stud Moisture - 1.5952% | | |
|---|---|---|
| # | Ins | Ext |
| 1 | 4.805 | 52.40 |
| 2 | 4.617 | 51.17 |
| 3 | 4.591 | 50.84 |
| 4 | 4.644 | 49.92 |
| 5 | 4.510 | 51.87 |
| 6 | 4.537 | 50.52 |
| 7 | 4.564 | 52.62 |
| 8 | 4.617 | 51.62 |
| 9 | 4.617 | 50.74 |
| 10 | 4.644 | 50.55 |
| 11 | 4.483 | 52.40 |
| 12 | 4.725 | 51.92 |
| 13 | 4.591 | 50.50 |
| 14 | 4.537 | 50.74 |
| 15 | 4.779 | 55.89 |
| 16 | 4.644 | 52.30 |
| 17 | 4.671 | 51.14 |
| 18 | 4.859 | 52.59 |
| 19 | 4.725 | 50.60 |
| 20 | 4.779 | 50.66 |

TABLE 2

M6 Stud
Moisture - 1.6082%

| # | Ins | Ext |
|---|-----|-----|
| 1 | 8.215 | 69.26 |
| 2 | 8.027 | 67.41 |
| 3 | 8.081 | 71.44 |
| 4 | 8.188 | 67.60 |
| 5 | 8.027 | 64.81 |
| 6 | 8.000 | 64.00 |
| 7 | 7.973 | 64.89 |
| 8 | 8.054 | 65.34 |
| 9 | 7.973 | 75.11 |
| 10 | 8.000 | 71.17 |
| 11 | 7.946 | 64.54 |
| 12 | 8.059 | 66.34 |
| 13 | 7.919 | 66.60 |
| 14 | 7.812 | 68.50 |
| 15 | 7.919 | 69.32 |
| 16 | 8.029 | 67.41 |
| 17 | 8.002 | 64.00 |
| 18 | 7.971 | 75.11 |
| 19 | 7.944 | 64.54 |
| 20 | 7.810 | 68.50 |

Figure 6:
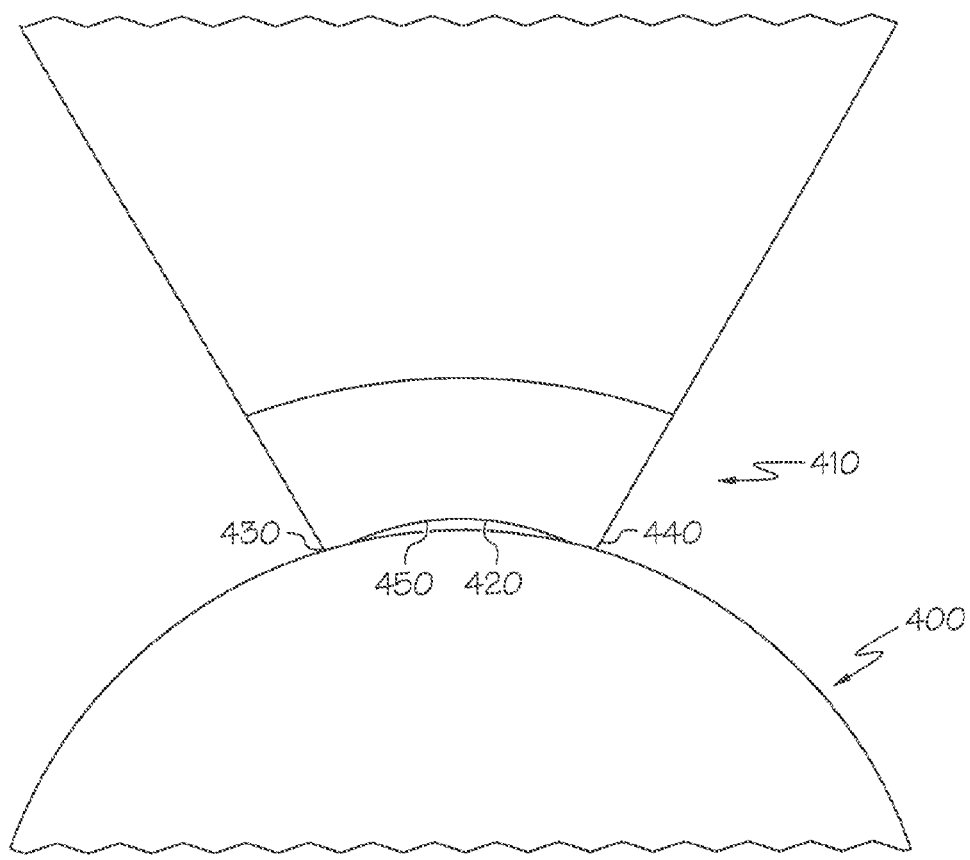
FIG. 6 illustrates a flap of a mounting feature in contact with a helical strand or thread of a bolt of the prior art.

FIG. 6 illustrates the prior art device and more specifically shows a flap or retention component of a mounting feature attaching to the helical strands of a mating bolt. As illustrated in FIG. 6, the retention component 410 of the prior art device is not able to contact the bolt 400 along a complete edge of the helical strands 400 of the bolt, thereby creating a gap. The retention component 410 only contacts the helical strands of the mating bolt 400 at limited, certain first 430 and second 440 contact points. The difficulty with the prior art device is that the retention component 410 is only able to contact the helical strands 400 of the bolt at two contact points 430 and 440, thereby creating an opening 420 between the center-most edge 450 of the retention component 410 and the bolt 400. This is undesirable as it can cause the cable tie to slip and over time the bundle can move from its secured location.

Figure 6A:
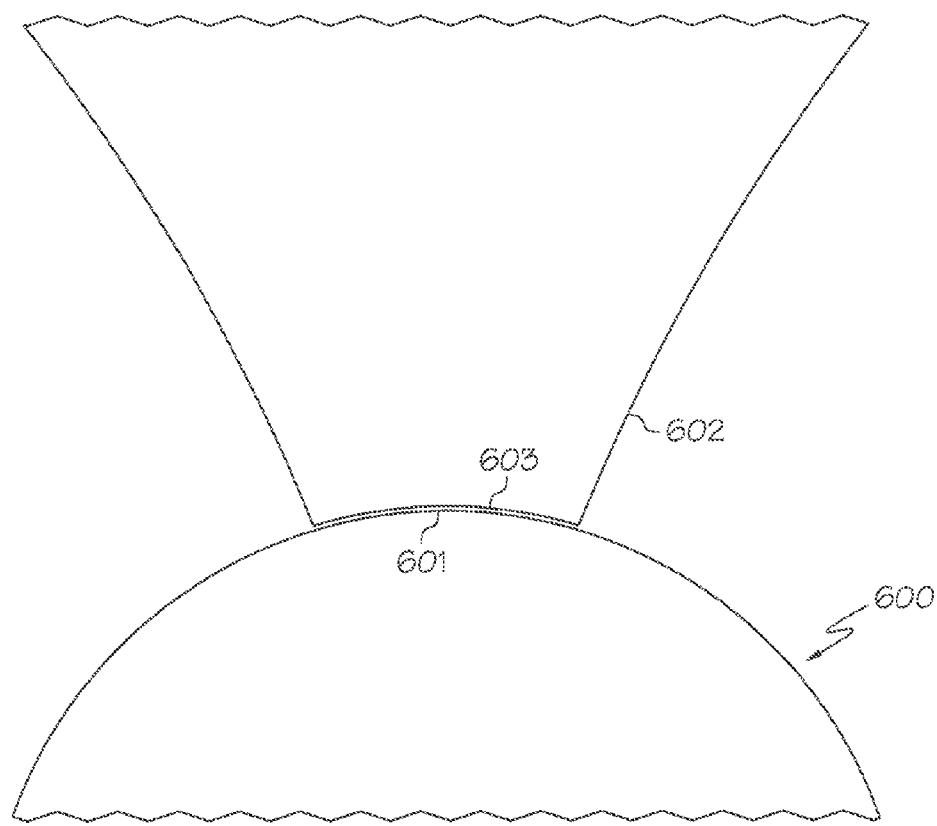
FIG. 6a illustrates a flap of a mounting feature in contact with a helical strand or thread of a bolt of the present invention.

As shown in FIG. 6A, the mating or mounting article is a bolt in which the bolt has a specific diameter such that the center-most edges 130 of the retention components 60 are sized to fit the outer diameter of the stem of the mating bolt. This allows the center-most edges of the retention components 60 to be in substantial contact with the mating bolt along a substantially complete circumference of the stem of the mating bolt, rather than a specified number of contact points on the mating bolt which occurs with prior art devices and lowers the retention force.

FIG. 6A is an enlarged view of a first section 602 of a retention component of the mounting feature presently disclosed illustrating an improvement of the prior art. The center-most edge 603 of the first section is flush or substantially flush or in contact with the edge 601 of the threads or helical strands 603 of the bolt 600.

The first section 150 and second section 160 of each retention component 60a, 60b, 60c of the mounting feature 140 may be sized, in one embodiment, to exactly or snuggly fit the diameter of the threads or helical strands of the bolt providing a more structurally stable mounting feature construction. In one embodiment, the center-most edges 130a, 130b of each first 150 and second 160 sections are sized to the exact diameter of the stem of the mating article having a radius of approximately 0.081". The present invention also contemplates embodiments in which the center-most edges 130a, 130b of the divided retention components 60a, 60b, 60c are not sized to have the exact diameter of the mating article but may contact the mating bolt at an increased number of contact points when compared with prior art devices thereby decreasing, or potentially eliminating the size of the gap between the mating bolt and the retention component.

In another embodiment, the mating article has a plurality of edges 130a, 130b and more than one retention component 60a, 60b, 60c such that at least one retention component 60a, 60b, 60c is flush with at least one edge 130a, 130b of the threads 221 or edges of the mating bolt and another retention component 60a, 60b, 60c is not completely flush with another edge or threads of the mating article. If the mating article is a bolt, as depicted in the figures of the present invention, the "plurality of edges" are located on the helical strands 221 of the bolt. The present invention contemplates embodiment in which not every retention component is completely flush with each edge of the mating article.

Figure 8:
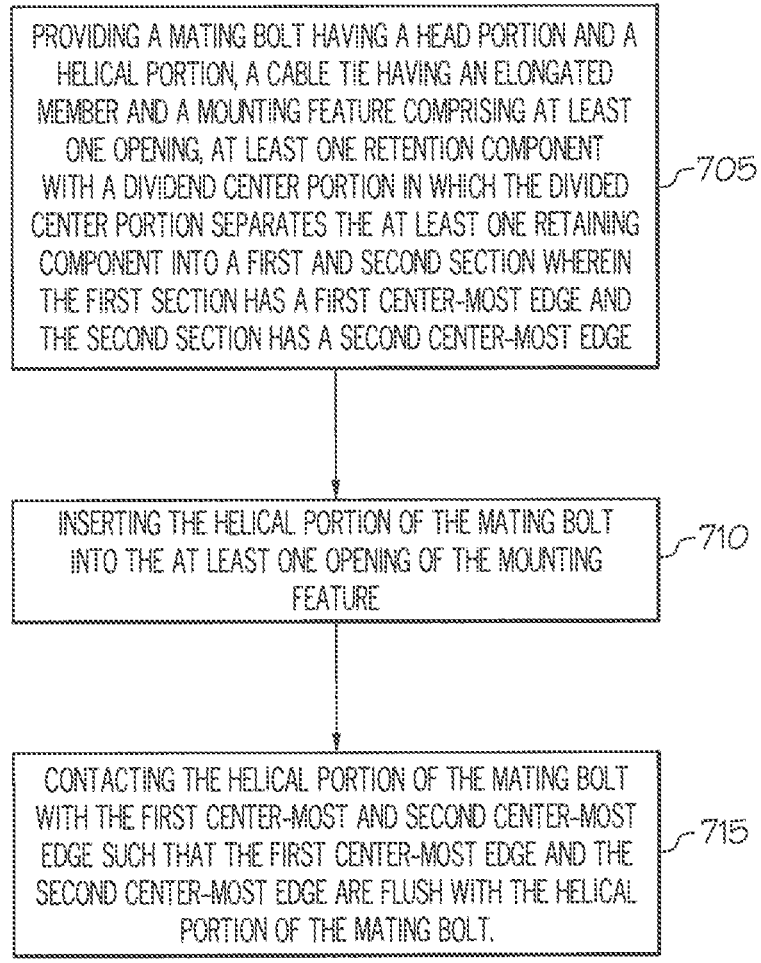
FIG. 8 provides a flow diagram illustrating a method of affixing a mounting feature of the present invention to a bolt.

The present invention also provides a method for affixing the cable tie illustrated in FIG. 1 to a stem of a mating article such as a bolt. The method is illustrated through the use of a block diagram shown in FIG. 8. First, a mating article such as bolt is provided at step 700. The bolt has a head portion having a top and bottom face and a helical threaded portion on the stem of the bold. A cable weld stud tie is provided in which the weld stud tie 20 has an elongated longitudinal member 10 at step 710. A mounting feature 140 is also provided having at least one opening 50 for insertion of the mating component at step 710. The mounting feature 140 has at least one retention component 60 with a divided center portion 61 in which the division separates the at least one retaining component 60 into a first section 150 and a second section 160 which flex independently from one another. The first section 150 has a first center-most edge 130a and a second center-most edge 130b and the second section 160 of the at least one retention component 60a, 60b, 60c. Second, the helical portion of the mating bolt is inserted into the opening 50 in the mounting feature at step 710. In one embodiment, at least three retention components 60 are utilized within the inner barrel of the mounting feature to contact the threaded portion. In this embodiment, the mating article is inserted into the circle created by the center-most edges of each first and second sections of each of the divided retention components. Next, the first and second sections of the at least one retention components flex independently of one another, and the at least one edge of the mating article contacts at least the first center-most edge of the first section and the second center-most edge of the second section of the retention component at step 720. In one embodiment, the mounting feature may be moved all the way down to the helical portion of the mating bolt so that the mounting feature contacts the top face of the head of the bolt.

It will thus be seen according to the present invention a highly advantageous mounting feature for a cable tie has been provided. While the invention has been described in connection with what is presently considered to be the most practical and preferred embodiment, it will be apparent to those of ordinary skill in the art that the invention is not to be limited to the disclosed embodiment, and that many modifications and equivalent arrangements may be made thereof within the scope of the invention, which scope is to be accorded the broadest interpretation of the appended claims so as to encompass all equivalent structures and products.

The inventors hereby state their intent to rely on the Doctrine of Equivalents to determine and assess the reasonably fair scope of their invention as it pertains to any apparatus, system, method or article not materially departing from but outside the literal scope of the invention as set out in the following claims.

What is claimed is:

1. A mounting feature comprising:
 an elongated fastening element having first and second sections, the first section including a mounting head and the second section including an elongated locking strip;
 the mounting head having at least one retention component having a center portion divided into a first and a second section, and the first and second sections each extending from a common base section of the retention component, the base section being attached to the mounting head, such that the first section and second section are able to flex independently from one another; and
 wherein the first section of the center portion has a first center-most edge and the second section of the center portion has a second center-most edge such that both the first and second center-most edges are sized to fit an edge of a stem of a threaded mating article and the center-most edges are in substantial contact with the mating article along a substantially complete circumference of the stem of the mating article.

2. The mounting feature of claim 1, wherein the mounting feature has three retention components.

3. The mounting feature of claim 1, wherein the mounting feature is used as a component of a cable tie.

4. The mounting feature of claim 1, wherein the mounting feature is used as a component for a fastener.

5. The mounting feature of claim 1, wherein the mating article has a diameter and both the first and second center-most edges are sized to be the diameter of the mating article.

6. A fastener comprising:
 a) a mounting feature having at least three retention components wherein each of the retention components has a center portion divided into a first and second section, and the first and second sections each extending from a common base section of the retention component, the base section being attached to the mounting head, in which the first section has a first center-most edge and the second section has a second center-most edge such and wherein each of the center-most edges is sized to accommodate the mating article and the center-most edges are in substantial contact with the mating article along a substantially complete circumference of a stem of the mating article;
 b) a tie; and
 c) a head feature.

7. The fastener of claim 6, wherein the mating article is a threaded bolt.

8. The fastener of claim 6, wherein the mating article has a diameter and the center edges are sized to the diameter of the mating article so that the center edges are flush with at least one edge of the mating article.

9. The fastener of claim 6, wherein each of the first and second sides independently flexes.

10. The fastener of claim 6, wherein ribs formed in a barrel of the mounting feature form a triangular shape.

11. The fastener of claim 6, wherein the fastener further comprises a plurality of ribs.

12. A method for affixing a mounting feature to a mating bolt comprising the steps of:
 providing a mounting feature having at least one opening and at least three retention components wherein the at least three retention components have a center portion divided into a first and second section, and the first and second sections each extending from a common base section of the retention component, the base section being attached to the mounting head, in which the first section has a first center-edge and the second section has a second center-most edge wherein each of the center-most edges are sized to accommodate the mating bolt and the center-most edges are in substantial contact with the mating bolt along a substantially complete circumference of a stem of the mating bolt;
 providing a mating bolt having a head portion and a helical portion;
 inserting the helical portion of the mating bolt into the at least one opening in the mounting feature; and
 contacting the helical portion of the mating bolt with the first center-most edge and the second center most edge such that the first center-most edge and the second center-most edge are flush with the helical portion of the mating bolt.

13. The method of claim 12, further comprising flexing the first and second section independently of one another.

14. The method of claim 12, wherein the mounting feature further comprises at least one channel.

15. The method of claim 12, wherein mounting feature further comprises at least one channel that has a greater length than the at least three retention components.

16. The method of claim 12, wherein the head of the mating bolt has a top and bottom face and the mounting feature is attached to the head of the mating bolt.

17. The method of claim 16, wherein the mounting feature is in contact with the top face of the head portion of the mating bolt.

18. The method of claim 17, wherein the at least three retention components are flush with the three edges of the mating bolt.

19. The method of claim 12, wherein the mating bolt has three helical edges.

* * * * *